US012718783B2

(12) United States Patent
Kamhawi

(10) Patent No.: US 12,718,783 B2
(45) Date of Patent: Aug. 25, 2026

(54) GUITAR CASE

(71) Applicant: Khaled Kamhawi, London (GB)

(72) Inventor: Marwan Kamhawi, Irbid (JO)

(73) Assignee: Khaled Kamawi, London (GB)

( * ) Notice: Subject to any disclaimer, the term of this patent is extended or adjusted under 35 U.S.C. 154(b) by 399 days.

(21) Appl. No.: 17/614,907

(22) PCT Filed: May 27, 2020

(86) PCT No.: PCT/GB2020/051276
§ 371 (c)(1),
(2) Date: Nov. 29, 2021

(87) PCT Pub. No.: WO2020/240174
PCT Pub. Date: Dec. 3, 2020

(65) Prior Publication Data

US 2022/0254323 A1 Aug. 11, 2022

(30) Foreign Application Priority Data

May 27, 2019 (GB) ..................................... 1907462

(51) Int. Cl.
*G10G 7/00* (2006.01)
*H04R 1/02* (2006.01)

(52) U.S. Cl.
CPC ............. *G10G 7/005* (2013.01); *H04R 1/025* (2013.01); *H04R 1/028* (2013.01); *H04R 2201/028* (2013.01)

(58) Field of Classification Search
CPC ...................................................... G10G 7/005
USPC ......................................................... 206/314
See application file for complete search history.

(56) References Cited

U.S. PATENT DOCUMENTS

| | | | | |
|---|---|---|---|---|
| 6,951,280 B1 * | 10/2005 | Lee | A45C 9/00 206/14 |
| 7,565,970 B1 * | 7/2009 | Erskine | G10D 13/12 206/751 |
| 7,872,187 B1 * | 1/2011 | Kushner | G10G 7/005 84/453 |
| 2002/0104426 A1 * | 8/2002 | Fediakov | G10G 7/005 84/329 |

(Continued)

FOREIGN PATENT DOCUMENTS

| | | | |
|---|---|---|---|
| EP | 2244248 A2 * | 10/2010 | G10G 7/005 |

*Primary Examiner* — Ernesto A Grano
*Assistant Examiner* — Symren K Sanghera
(74) *Attorney, Agent, or Firm* — Weiss & Moy, PC; Jeffrey D. Moy

(57) ABSTRACT

A guitar case comprises an upper body, a lower body, pivotally connected to the upper body, so that the upper body and lower body have a first closed configuration, for housing a guitar, the stowed guitar extending between the upper body and the lower body, the upper body and lower body have a second open configuration where the upper body is pivoted adjacent to the lower body. An amplifier and speakers are situated in the upper body, the speakers being directed outwards from the guitar case. Alternatively, the guitar case comprises a body an amplifier and two speakers, situated in the body, the two speakers positioned in a spaced relationship, the space separating them forming part of a cavity for accommodating the neck of a guitar the two speakers are joined a reinforcing yoke extending across the part of a cavity formed between the two speakers.

9 Claims, 12 Drawing Sheets

(56) References Cited

U.S. PATENT DOCUMENTS

| | | | | |
|---|---|---|---|---|
| 2004/0217026 | A1* | 11/2004 | Neilson .................. | A45C 11/24 206/314 |
| 2010/0059409 | A1* | 3/2010 | Crowder ................ | G10G 7/005 206/757 |
| 2010/0230307 | A1* | 9/2010 | Kriesel .................. | G10G 7/005 206/314 |
| 2013/0327662 | A1* | 12/2013 | Loban .................... | G10G 7/005 206/314 |
| 2015/0294657 | A1* | 10/2015 | Hungate .............. | B65D 81/022 206/314 |
| 2015/0310842 | A1* | 10/2015 | Coburn .................. | G10G 7/005 206/314 |
| 2016/0133239 | A1* | 5/2016 | Hook ...................... | A45F 3/047 224/654 |
| 2022/0005444 | A1* | 1/2022 | Grant ..................... | G10G 5/005 |

* cited by examiner

GUITAR CASE

The present specification relates to a guitar case, in particular one that incorporates a speaker and other features.

An electric guitar requires amplification and loudspeakers in order that the sound of the guitar can be heard. This means that a performer who uses a an electric guitar requires a lot of equipment in order to perform, and this is very inconvenient to transport, often requiring help from others to carry equipment, or necessities several trips, even if a vehicle is used to transport the equipment.

Guitar cases can have other disadvantages, such as offering inadequate protection to the guitar, as well as consuming excessive storage space when not in use for its primary and only function of transportation.

The object of the present invention is to provide a guitar case that overcomes these problems.

According to the present invention, there is provided a guitar case according to the claims.

The case described here is particularly for a guitar, but can be applied to other musical instruments/equipment, particularly string instruments having a fretboard and neck.

The terms 'upper' and 'lower' are used herein to correspond to the illustrations; it will be realised though that the case can be inverted so that the upper portion is oriented to the ground and the lower portion spaced from the ground.

The invention will now be described, by way of example, with reference to the drawings, of which FIG. 1 is a perspective view of a guitar case in a first closed position of an embodiment of the invention;

Figure 5A:
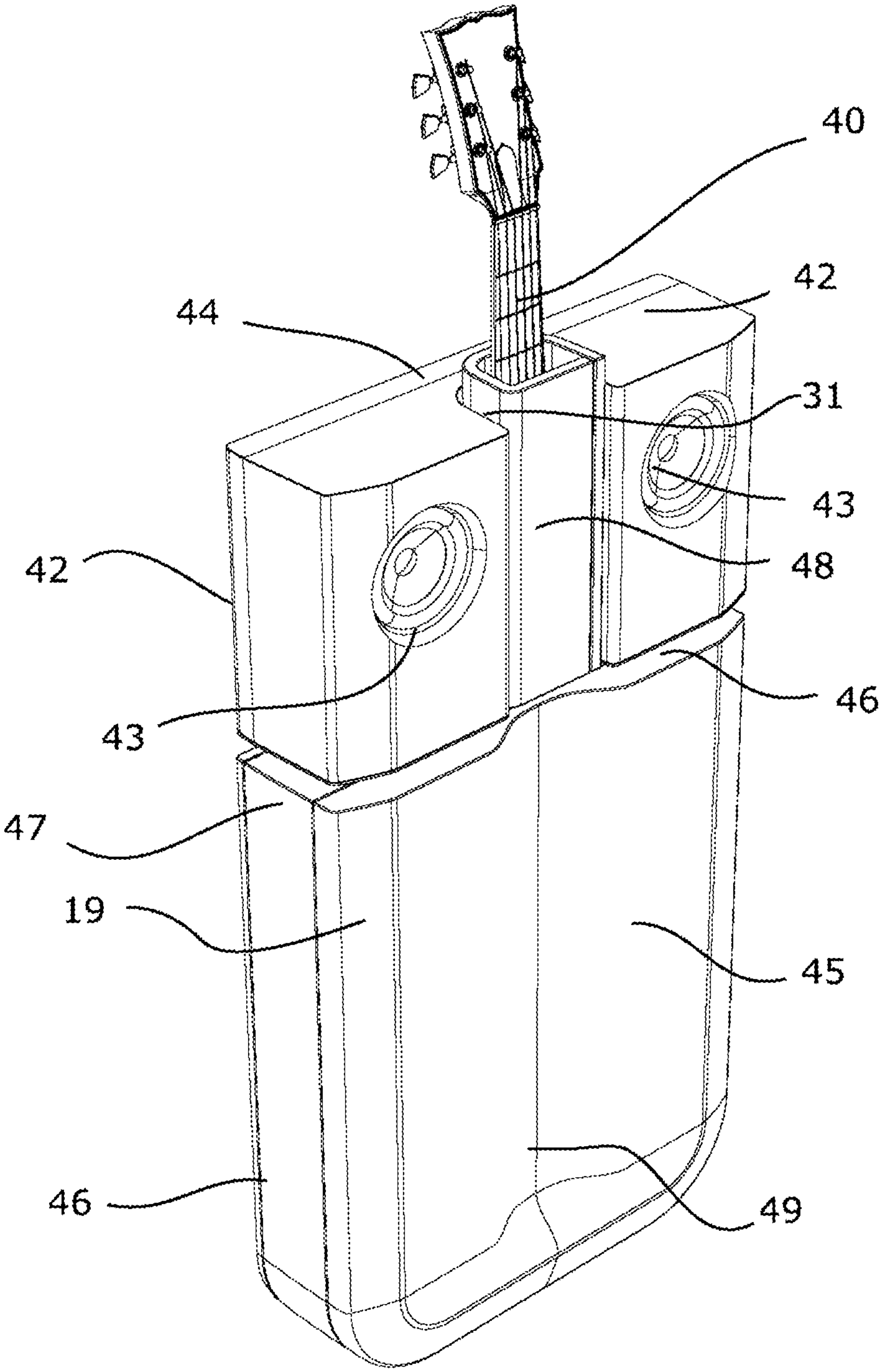
Figure 5B:
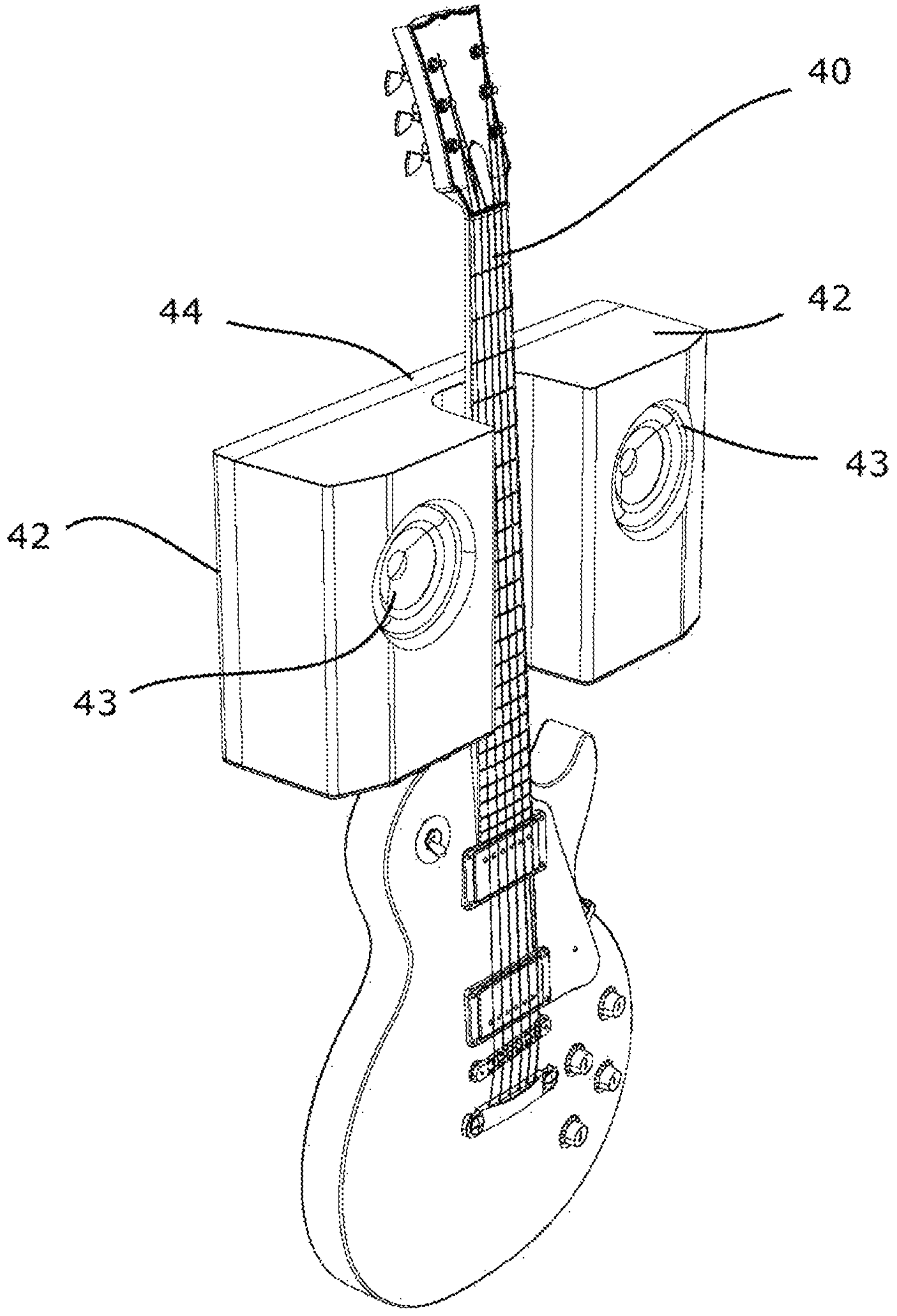
Figure 6:
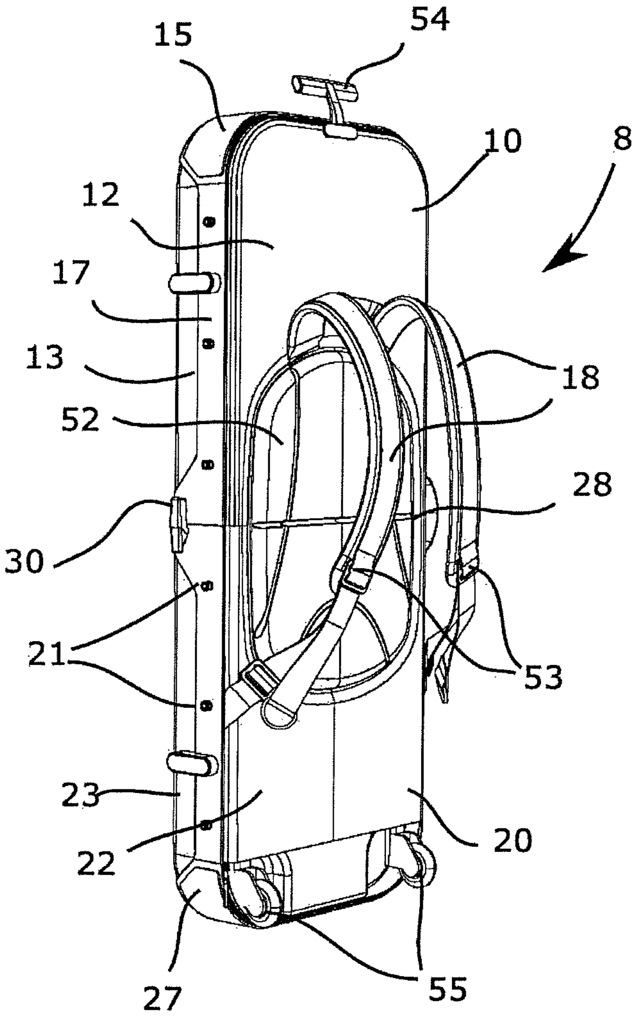
Figure 7:
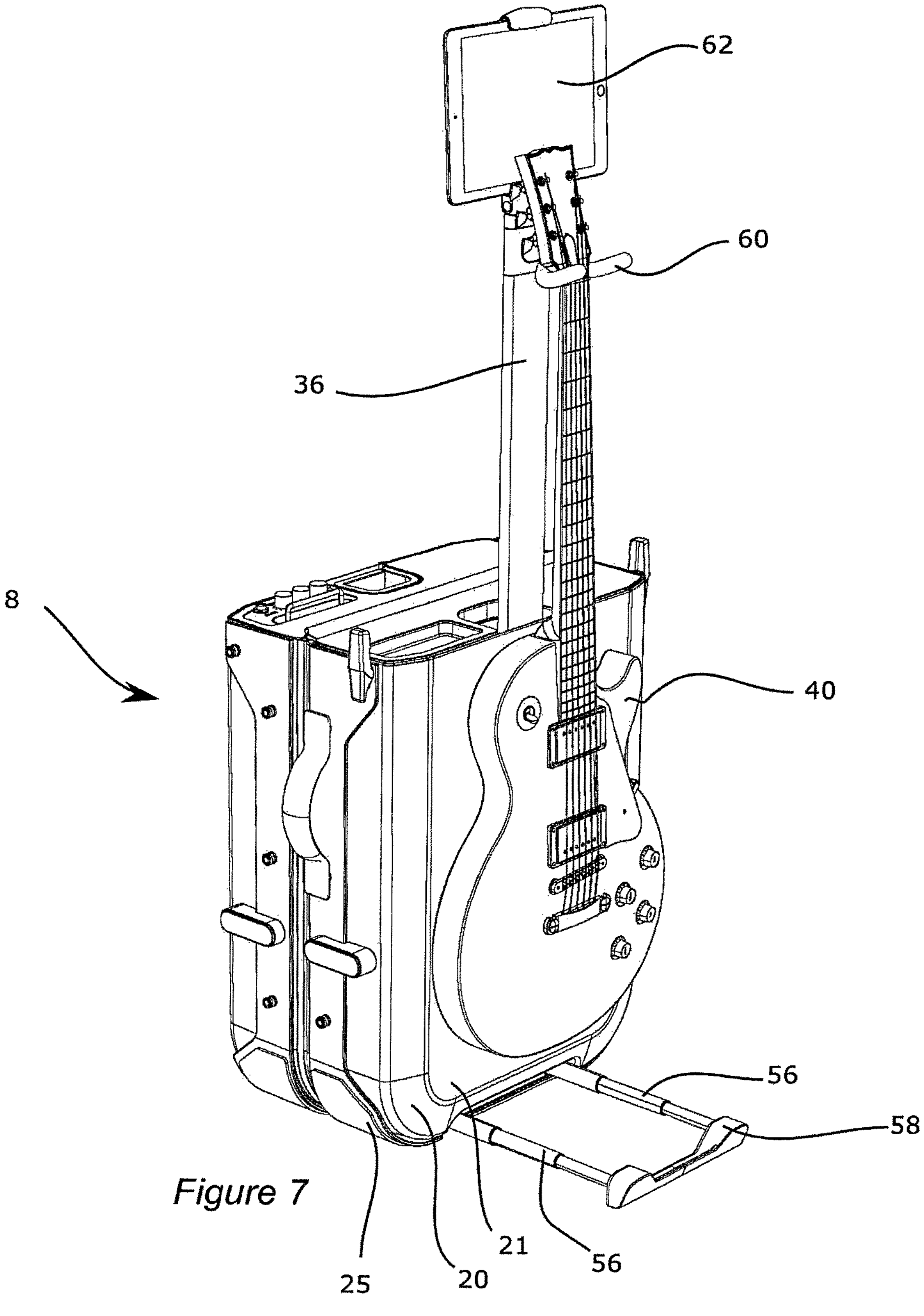
Figure 8A:
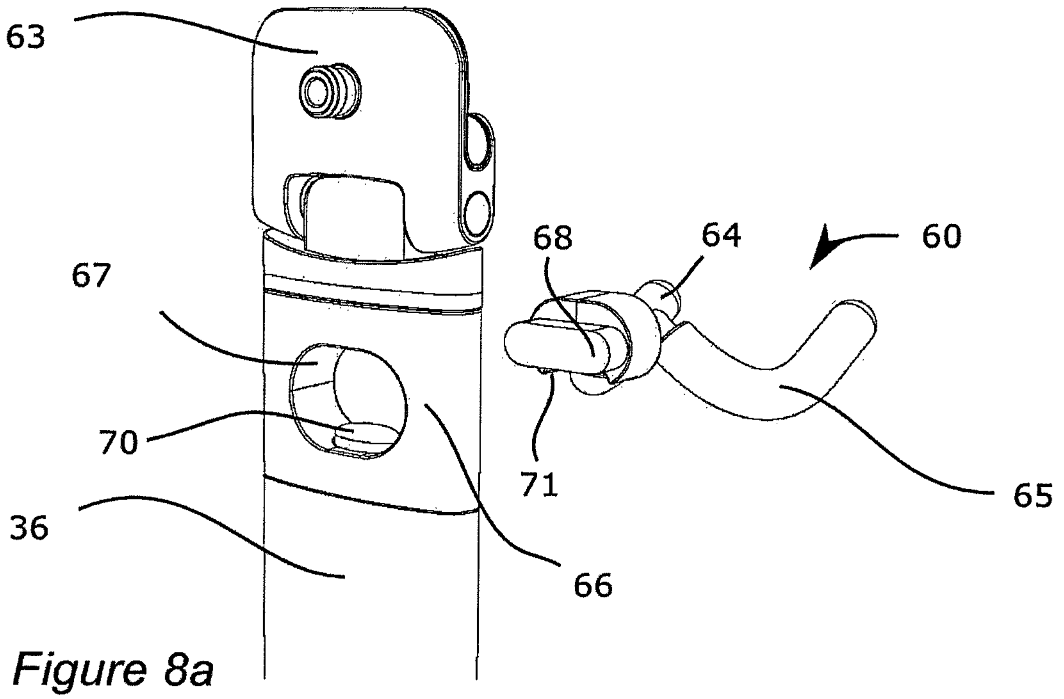
Figure 8B:
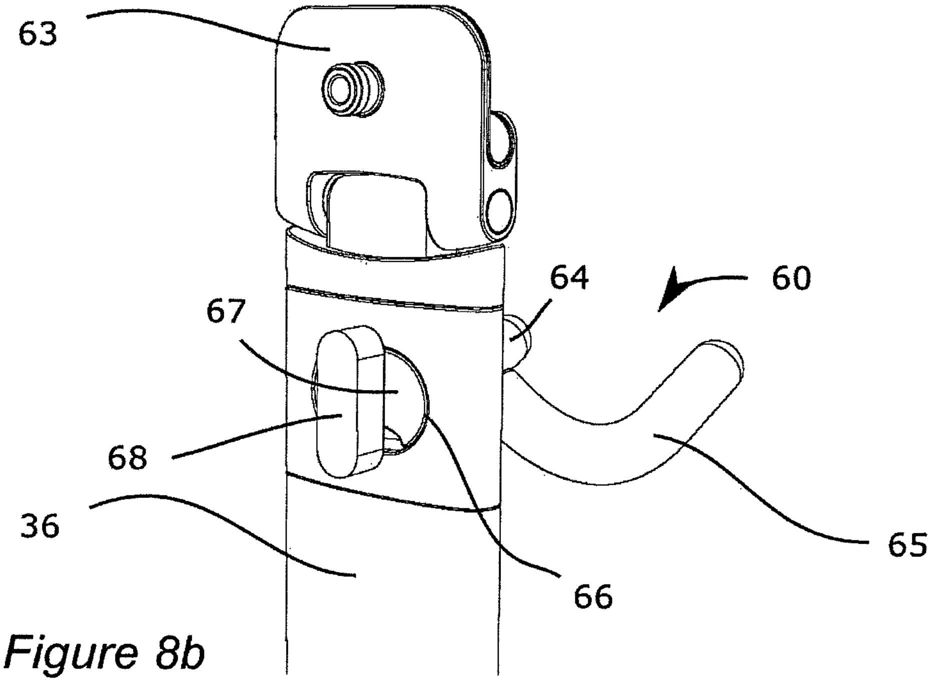
Figure 9:
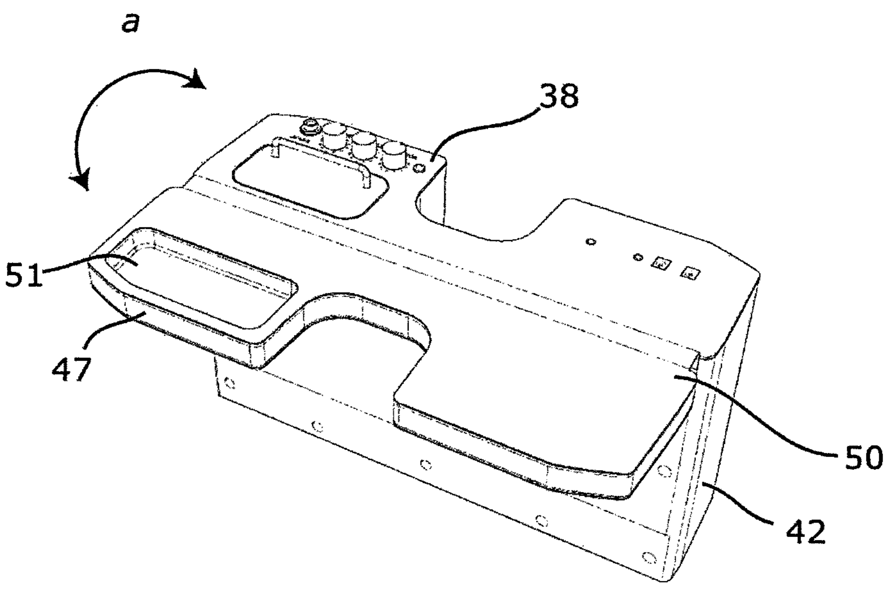
Figure 10:
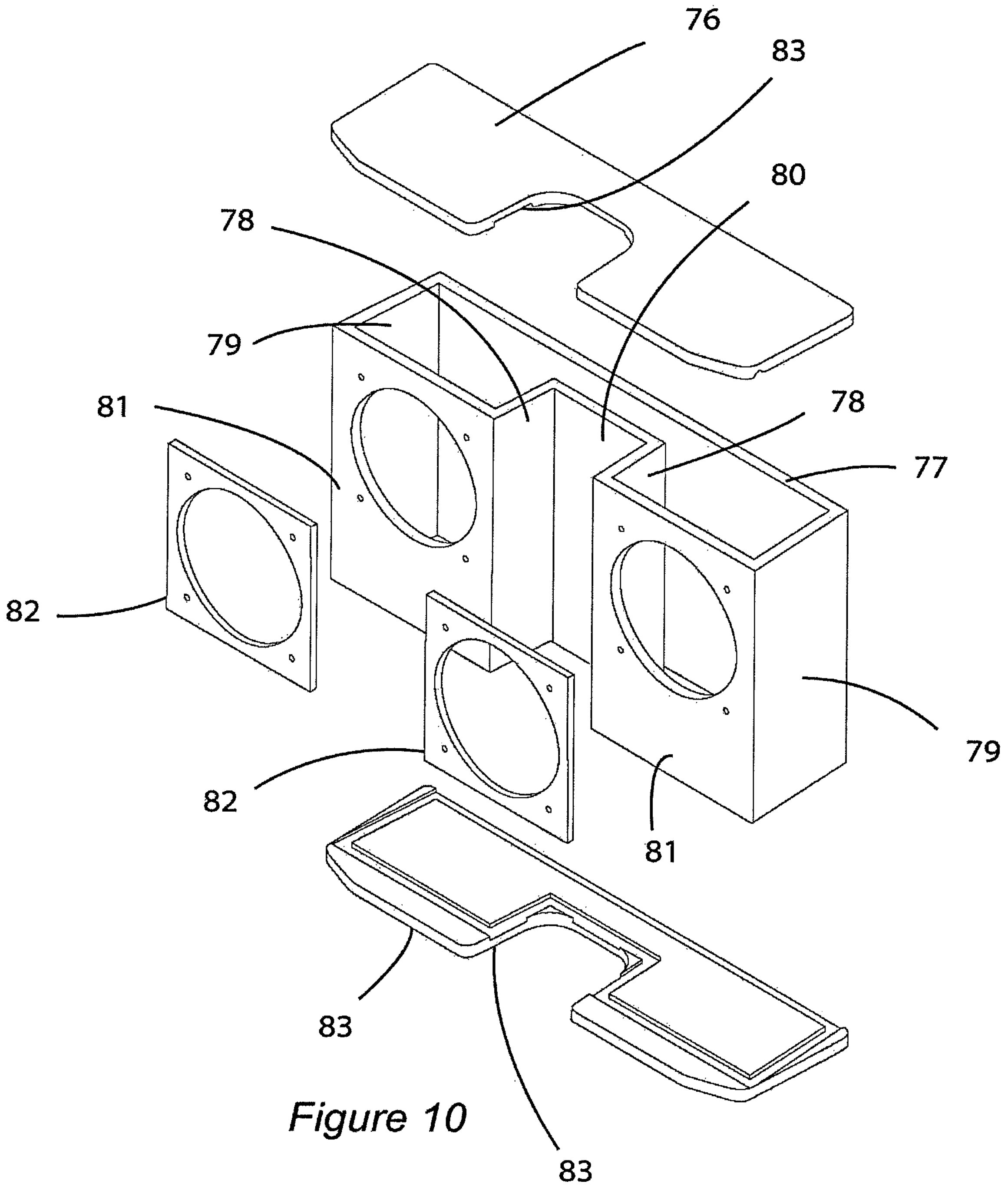
Figure 11:
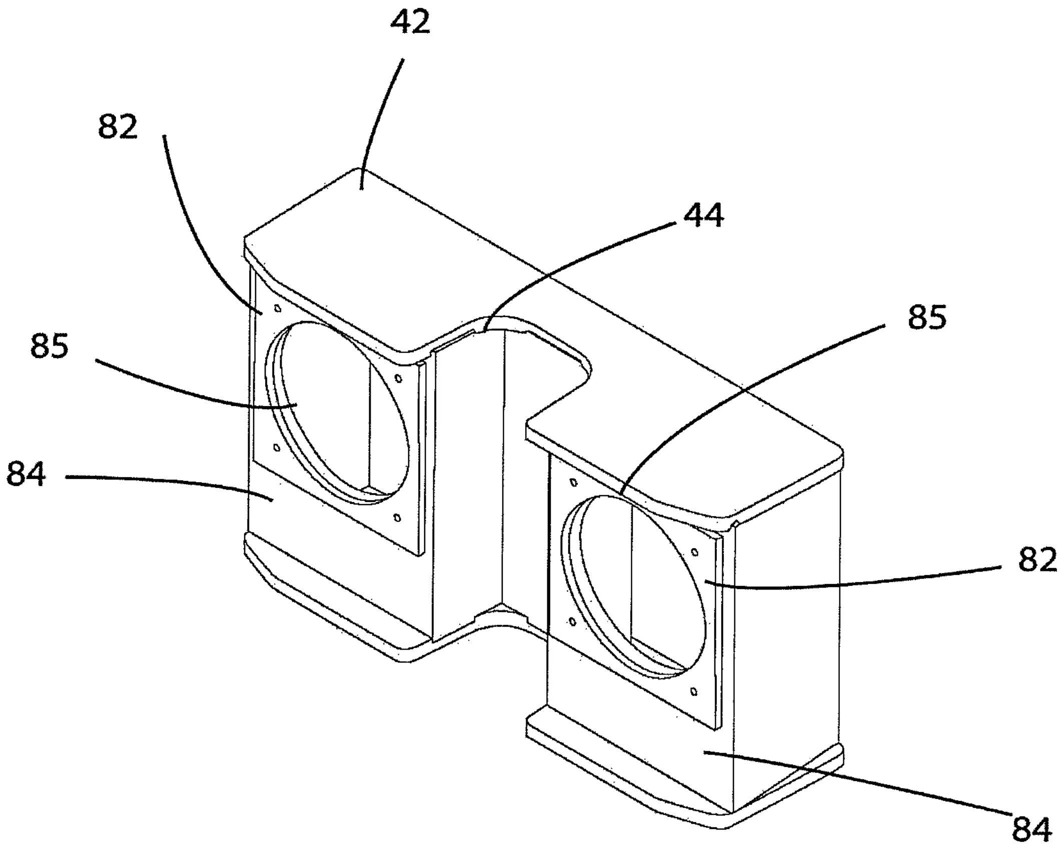

FIGS. 5*a* and 5*b* are perspective views of internal components of the guitar case, FIG. 5*a* showing the internal components in the first closed position and FIG. 5*b* showing the speaker cabinets and guitar with other components omitted for clarity;

FIG. 6 is a rear perspective view of the guitar case;

FIG. 7 is a perspective view of a guitar case in a second open position with the stand extended;

FIGS. 8*a* and 8*b* are perspective views of the spine;

FIG. 9 is a perspective view of the speaker cabinets;

FIG. 10 is a exploded perspective view of a further embodiment of the speaker cabinets; and FIG. 11 is a perspective view of this embodiment of the speaker cabinets partially assembled.

Figure 1:
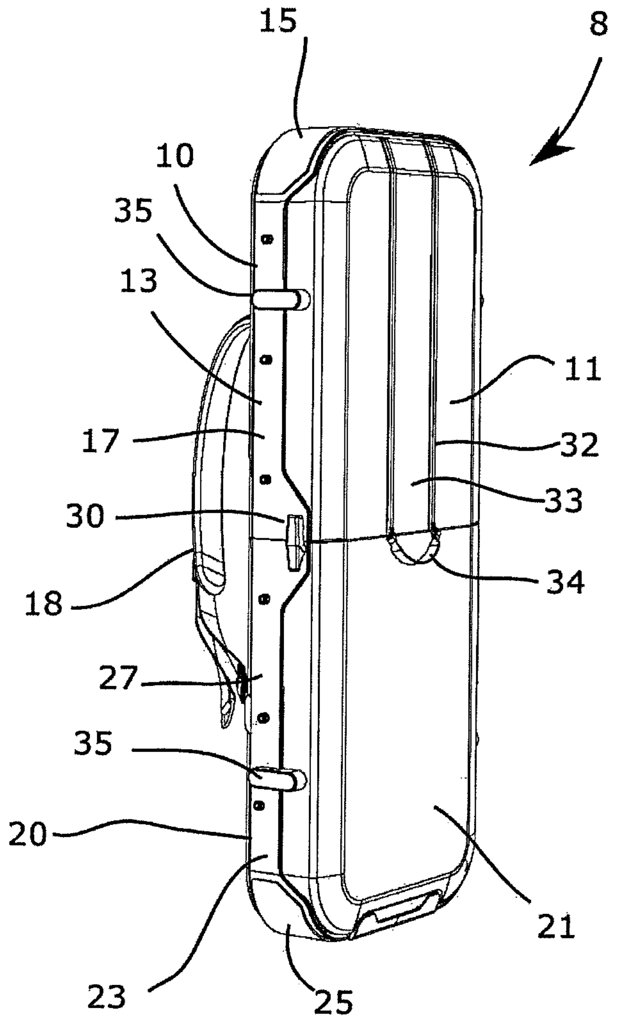

Referring to FIG. 1, the guitar case 8 comprises an upper body 10 and a lower body 20. The upper body 10 has a front wall 11, a rear wall 12, side walls 13 and a top wall 15, while the lower body 20 has a front wall 21, a rear wall 22, side walls 23 and a bottom wall 25. The guitar case 8 is generally cuboid, so that the front walls 11, 21 of the upper body 10 and lower body 20 lie in the same plane and in the closed position of the guitar case 8 form a single surface, as do the rear walls 12, 22 of the upper body 10 and lower body 20, and each pair of side walls 13, 23. FIG. 1 shows the guitar case 8 in the closed position. The guitar case 8 includes carry straps 18 for carrying the guitar case 8, and feet 35 upon which the guitar case 8 can be laid on the on the ground with the side walls 13, 23 parallel to and adjacent the ground.

The upper body 10 and lower body 20 are both formed of rigid material, apart from some or all of the front wall 11 as will be explained below. A frame runs around the guitar case

8, reinforcing the side walls 13, 23, top wall 15 and bottom wall 25. The frame is split into two parts, with an upper frame 17 formed in a U-shape to run along the side walls 13 and top wall 15 of the upper body 10, and a lower frame 27 also formed in a U-shape (though rotated 180° with respect to the upper frame 17) running along the side walls 23 and bottom wall 25 of the lower body 20, the two frame parts meeting to form a continuous band around the guitar case 8.

Figure 2:
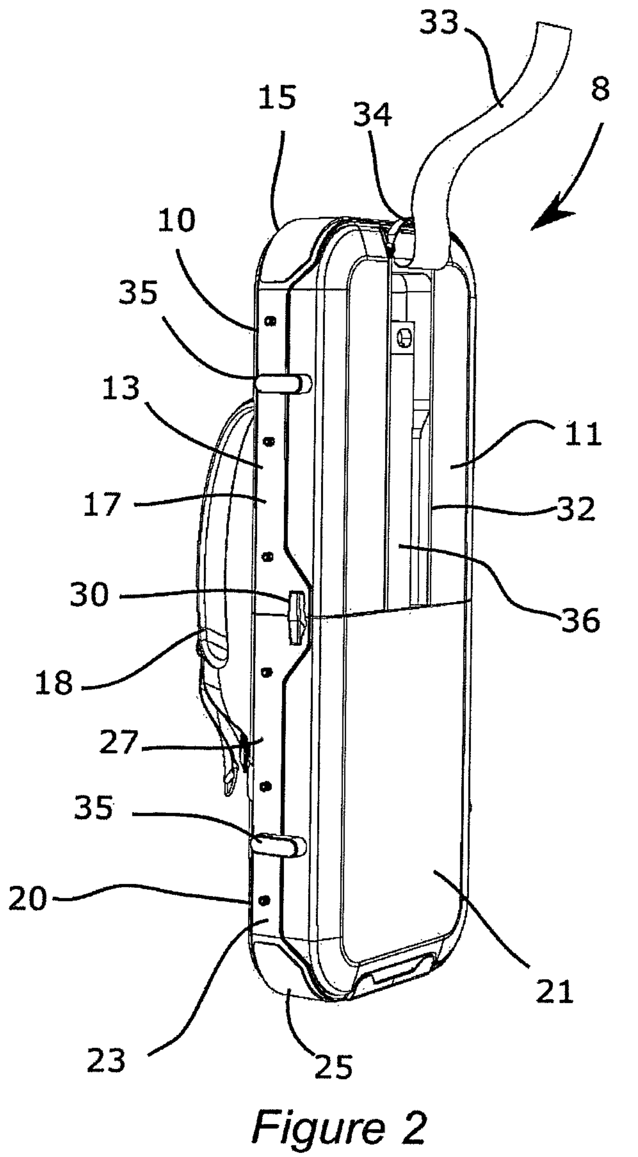
FIG. 2 is a perspective view of a guitar case showing part of the operation of the guitar case.

Referring also to FIG. 2, the upper body 10 has a long opening 32, which is covered by a flap 33 of material (fabric or hard material), which can be secured or detached along the length of the opening 32 by a zipper, one side of the zipper running the length of the edge of the opening 32, and the other side co-operating side of the zipper running the length of the edge of the flap 33. Part of the material of the flap 33 adjacent the top wall 15 is attached to the upper body 10, so that the flap 33 remains attached to the upper body 10 even when the zipper is fully released. The zipper may feature two sliders, joined by a handle 34, so that both long sides of the flap 33 can be opened or closed by raising or lowering the handle in a single motion.

Figure 3:
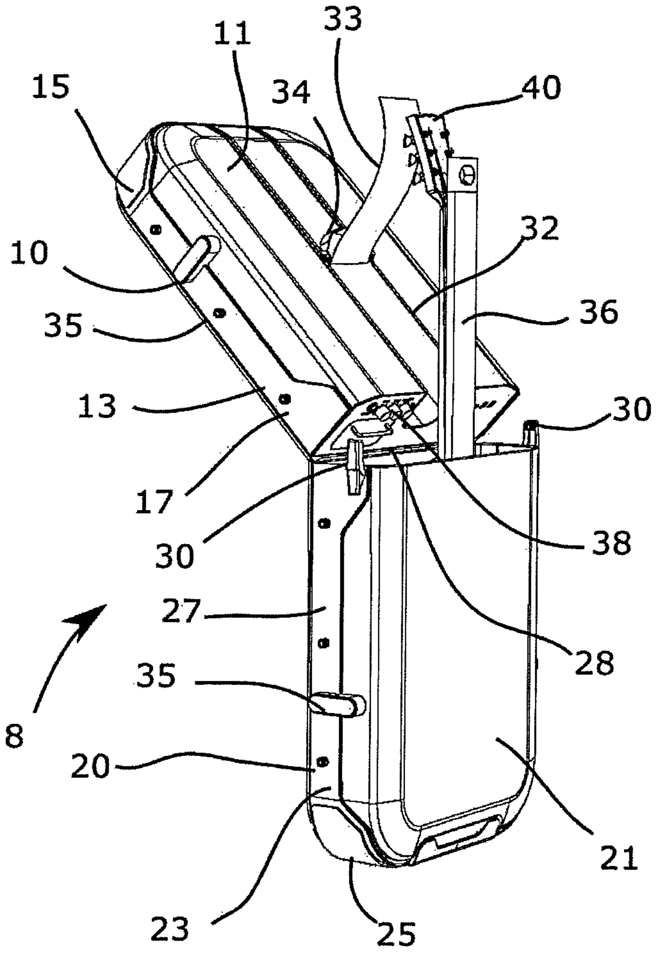
FIG. 3 is a perspective view of a guitar case in an intermediate position during.

Referring to FIG. 3, the upper body 10 is attached to the lower body 20 by a hinge 28 that extends between the abutting edges of the rear walls 12, 22. The hinge may be mechanical, such as a piano hinge type, or it may be a length of pliable material joining the upper body 10 and the lower body 20. When engaged, clasps 30 constrain the upper body 10 and lower body 20 in the positions illustrated in FIGS. 1 and 2; when the clasps 30 are disengaged, the upper body 10 may be rotated relative to the lower body 20 about the hinge 28 as shown in FIG. 3.

Figure 4:
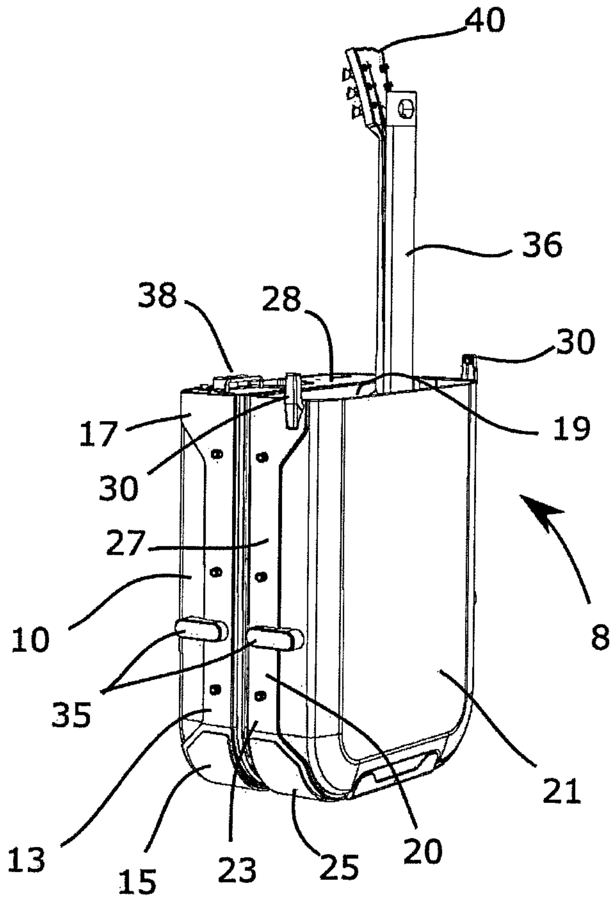
FIG. 4 is a perspective view of a guitar case in a second open position.

Referring also to FIG. 4, the upper body 10 is rotatable relative to the lower body 20 about the hinge 28 until the front wall 11 of the upper body 10 abuts or rests adjacent the rear wall 22 of the lower body 20, and the top wall 15 of the upper body 10 rests on the ground. In this position, the guitar case 8 is fully open.

The lower body 20 includes a spine 36 that extends upwards as shown in FIGS. 3 and 4. The spine is dimensions so that it can pass through the opening 32 (when the flap 33 has been opened to expose the opening 32) as the upper body 10 is pivoted about the lower body 20 so that the spine 36 does not impede the opening of the guitar case 8. The spine 36 is rigid, and protects the neck of the guitar, particularly when the guitar case 8 closed and is being carried, when it may be subjected to knocks. The spine 36 is preferably retractable, as is explained below.

The lower body 20 is substantially hollow and features a cavity 19 that can accommodate a guitar 40, and which is accessible through an upper opening of the lower body 20 when the guitar case 8 is in the fully open position shown in FIG. 4. Referring also to FIG. 5*a*, the lower body 20 may include padding material, such as front padding 45, side padding 46 (which also extends across the bottom of the lower body 20) and rear padding (not here shown). Referring also to FIG. 9, upper padding 47 may be included, preferably at the bottom of the upper body 10, and could be used to cover the amplifier controls 38. The upper padding 47 may include recessed sections to accommodate protruding buttons or knobs of the amplifier controls 38. The upper padding 47 may include a layer of fabric or leather, part of which is secured to the speaker cabinets 42 so as to act as a hinge by which means the speaker cabinets 42 can be accessed by pivoting the upper padding 47 about arrow a. Alternatively, the upper padding 47 could instead be included as a removable or pivotable part of the lower body 20.

The guitar case 8 is in the open position shown in FIG. 4, a guitar 40 can be placed in the cavity 19 of the lower body 20, which the neck of the guitar extending upwards outside the cavity 19. Referring also to FIGS. 5*a* and 5*b*, the upper body 10 includes two speaker cabinets 42, that each include a speakers 43, the two speaker cabinets 42 being spaced apart by a yoke 44. The yoke 44 is positioned against the rear wall 12 of the upper body 10, and its thickness is such that an elongated cavity 31 is defined between the speaker cabinets 42, coincident with the opening 32.

The front padding includes a channel 49 which receives the spine 36, so that the spine 36 can be retracted into and extracted from this channel 49; the spine 36 and channel 49 may include co-operating stop means which ensure that the spine cannot be completely removed from the channel 49. When the guitar 40 has been placed in the cavity 19, the spine 36 can be extracted from the channel 49 to protect the neck of the guitar. When the upper body 10 is pivoted about the hinge 28 to the closed position with the flap 33 open, the elongated cavity 31 accommodates the neck of the guitar 40 and the extended spine 36. Once the upper body 10 is in the closed position, the flap 33 may be zipped shut, and the clasps 30 secured, so that the guitar case 8 may be carried with the guitar 40 housed safely within it. The guitar 40 may be removed by reversing this operation.

The speaker cabinets 42 include an amplifier to amplify and process a signal from an electric guitar. When the guitar case 8 is in the fully open position shown in FIG. 4, the amplifier controls 38 are fully exposed and facing upwards. The amplifier controls 38 include one or more guitar jacks, and other controls associated with an electric guitar amplifier, such as volume controls, balance, and guitar effects. The amplified signal is then fed to the speakers 43. Thus, in the open position shown in FIG. 4, a guitar can be plugged into the amplifier controls 38 and the guitar case 8 functions as an amplifier and speaker system. The speaker cabinets 42 may include a rechargeable battery, and/or a power lead may be used to power the amplifier and speakers or recharge the battery. The front wall 11 is formed of sound transparent fabric, which protects the speakers 43, but allows sound to pass without substantial attenuation.

Thus, the guitar case 8 houses a guitar and allows it to be transported safely, as well as providing an integrated amplify and speaker system. In the open position shown in FIG. 4, the guitar case 8 has a lower centre of gravity and contacts the ground across a greater width than when the guitar case is closed, leading to a stable configuration for use as an amplifier and speaker system.

The spine 36 could include amplifier controls. Referring to FIG. 7, the spine could also include a cradle to allow a tablet 62 or other computer device to be supported and/or docked to it, and include connection means so that the amplifier and speakers could be controlled by the tablet. As will be described in more detail below, the spine could also incorporate support means to allow the guitar to be attached or supported by it when the guitar case is in the open position shown in FIG. 4, so that the guitar case functions as a guitar stand.

Referring back to FIG. 4, although the speaker cabinets 42 are shown here with a yoke 44 spacing them, they may equally be secured in the upper body 10 in a spaced arrangement without a yoke, but still provide an elongated cavity 31 to accommodate the guitar neck and headstock. The amplifier could be housed in one speaker cabinets 42, or the electronics be distributed between the speaker cabinets 42; it could likewise be accommodated elsewhere in the upper body 10. Likewise, any battery or charging system could be accommodated in one or both speaker cabinets 42, or situated elsewhere in the upper body 10.

Referring to FIG. 6, the guitar case 8 may include carry straps 18, here shown on the rear wall 12 and rear wall 22, although it will be realised that the position may be varied. Padding 52 may be included on the rear walls 12 22 behind the carry straps 18 for the comfort of the user. The carry straps 18 ideally include adjustment buckles 53 so that their length may be varied as required.

The lower body 20 may include wheels 55 at the lower end of the lower body 20, mounted on the bottom wall 25 and/or the rear wall 22, and a handle 54 mounted at the upper end of the upper body 10 on the top wall 15 and/or rear wall 12, so that the user can place the guitar case 8 on the ground and pull the case by the handle 54, carried by the wheels 55. The handle may be a T-bar type handle, and could be telescopic i.e. retractable into and extendable from the upper body 10.

Referring to FIG. 7, the lower body 20 of the guitar case 8 features a stabiliser foot 58 supported on telescopic arms 56, 57. The telescopic arms 56, 57 are arranged in a parallel manner to extend substantially horizontally outwards from the region on the lower body 20 where the front wall 21 and bottom wall 25 meet. The stabiliser foot 58 rests upon the ground, and ensures that the guitar case 8 cannot topple over. When not required, the telescopic arms 56, 57 can be retracted into the lower body 20, the stabiliser foot 58 being housed in a recess so that its outer surface is flush with the lower body 20.

Also referring to FIG. 7, the spine 36 can be used to hang a guitar 40, a hanger 60 being provided on the spine 36 for this purpose. Referring to FIGS. 8*a* and 8*b*, the hanger 60 comprises two shaped arms 64, 65 are provided on a hanger stub 67, the hanger stub 67 being engageable with a locating hole 66 on the spine 36. The locating hole 66 features a locating lug 70, which engages with a corresponding recess 71 on the hanger stub 67, so that the orientation of the hanger 60 is constrained. The hanger stub 67 and locating hole 66 are both oval or stadia shaped, having a longer major axis and a shorter minor axis. The hanger stub 67 is then secured be means of a swivel clip 68 which is oriented along the major axis when the hanger stub 67 is first inserted, and then rotated so as to align with the minor axis and secure the hanger stub 67, as shown in FIG. 8*b*. To remove the hanger 60, the sequence is reversed. FIGS. 8*a* and 8*b* also show the cradle 63 for the tablet 62.

The guitar case 8 could be provided substantially as described, but without the speaker cabinets 42 and amplifier. Alternatively, the case and amplifier could be further integrated, so that the case is effectively an amplifier that can house a guitar or similar equipment. The case herein is shown as folding so that the upper body 10 comes to rest in the open state directly abutting the lower body 20, however it will be realised that the upper body could be partially opened so at to form an angle with the lower body (e.g. a 45 degree angle), and form a stable amplifier system. It will also be realised that the case and speaker cabinets 42 could be disposed in an inverted sense, so that the speaker cabinets 42 are in the lower body 20, with the guitar being disposed so that the body of the guitar is housed in the upper body and the neck and headstock housed in the lower body 20. It will also be realised that the configuration of upper body 10, lower body 20 and speaker cabinets 42 could be supplied without a spine 36.

Also, the speaker cabinets 42 could be supplied without the guitar case 8. Referring to FIG. 10, the housing of the speaker cabinets 42 may be formed from panels, such as a top 76, base 75, back 77, two inner sides 78, two outer sides 79, an inner back 80, and two baffles 81. When assembled as shown in FIG. 11, these two compartments 84 for the loudspeakers, with speaker holes 85 each of which will be covered by felt (not here shown) secured by a baffle brace 82.

The base 75 and top 76 each have a cutout portion 83, so that the two compartments 84 of the speaker cabinets 42 are separated by yolk or channel 44 as previously described, which can accommodate a guitar neck. As previously described, the electronics for the amplifier are housed in the speaker cabinets 42.

Thus the speaker cabinets 42 can be placed or installed in a suitably dimensioned conventional rectilinear guitar case to provide a convenient portable set of speakers and amplifier while still providing room for the guitar to be housed in the guitar case, and could also be formed integrally with a generally rectilinear case, including a case which open in a conventional fashion, that is, where the guitar body, neck and headstock are housed in one side of the case and the other side of the case opens to reveal the entire guitar.

For all the embodiments described, the amplifier controls 38 are ideally positioned on the upper surface of the speaker cabinets 42; however, it will be realised that amplifier controls 38 could be positioned elsewhere, and indeed the amplifier could be controlled by a wired connection or wirelessly obviating the need for some or all accessible amplifier controls 38 on the speaker cabinets 42 itself.

The invention claimed is:

1. A musical instrument case comprising an upper body, which includes a cavity capable of accommodating a neck and headstock of a musical instrument such as a guitar, the upper body having a front panel, a rear panel, side panels and a top panel which make up an upper part of the musical instrument case;

a lower body, pivotally connected to the upper body, the lower body capable of accommodating a body of the musical instrument;

such that the upper body and lower body have a first closed configuration, capable of housing the musical instrument, the musical instrument extending between the upper body and the lower body when the musical instrument is stowed in the musical instrument case, the upper body and lower body have a second open configuration where the upper body is pivoted adjacent to the lower body, wherein when the musical instrument case is in the open position the top panel of the upper body rests against the ground and the rear panel of the upper body abuts the lower body, and wherein the front panel of the upper body includes a long opening through which the neck and headstock of the musical instrument is able to pass through the long opening when the upper body is pivoted between the first closed position and the second open position.

2. The musical instrument case according to claim 1, wherein the lower body includes a stiff spine that extends upwards into the upper body, the position of the spine being such that it is substantially coincident with the neck of the musical instrument when the musical instrument is stowed in the musical instrument case, and wherein the stiff spine remains extended upwards from the lower body after the upper body has been pivoted adjacent to the lower body.

3. The musical instrument case according to claim 1, wherein the long opening includes a cover.

4. The musical instrument case according to claim 3, wherein the cover is formed from fabric or a hard material and can be removeably secured along the length of the opening by a zip fastener.

5. The musical instrument case according to claim 1, wherein two wheels and a handle are included, the two wheels being located at the opposite end of the musical instrument case to the handle.

6. The musical instrument case according to claim 5, wherein the handle is mounted at an upper end of the upper body and is extendible or telescopic.

7. The musical instrument case according to claim 1, wherein the upper body has a first frame substantially extending along and reinforcing the side panels and top panel of the upper body, and the lower body has a second frame substantially extending along and reinforcing the side panels and bottom panel of the lower body.

8. The musical instrument case according to claim 2, wherein the spine includes a hanging means to support the musical instrument when the musical instrument case is in the open position.

9. The musical instrument case according to claim 8, wherein the musical instrument case includes an extendible stabilising means.

* * * * *